US010695851B2

United States Patent
Ribbeck et al.

(10) Patent No.: US 10,695,851 B2
(45) Date of Patent: Jun. 30, 2020

(54) METHOD FOR DEBURRING BEVEL GEARS AND CNC GEAR-CUTTING MACHINE HAVING CORRESPONDING SOFTWARE FOR DEBURRING

(71) Applicant: Klingelnberg GmbH, Hückeswagen (DE)

(72) Inventors: Karl-Martin Ribbeck, Remscheid (DE); Gary Töpfer, Remscheid (DE); Jürgen Weber, Hückeswagen (DE)

(73) Assignee: KLINGELNBERG GMBH (DE)

( * ) Notice: Subject to any disclaimer, the term of this patent is extended or adjusted under 35 U.S.C. 154(b) by 0 days.

(21) Appl. No.: 16/251,878

(22) Filed: Jan. 18, 2019

(65) Prior Publication Data

US 2019/0224767 A1    Jul. 25, 2019

(30) Foreign Application Priority Data

Jan. 25, 2018   (EP) ..................... 18153423

(51) Int. Cl.
 *B23F 19/12*   (2006.01)
 *B23F 19/00*   (2006.01)
 (Continued)

(52) U.S. Cl.
 CPC .............. *B23F 23/006* (2013.01); *B23F 9/00* (2013.01); *B23F 17/003* (2013.01);
 (Continued)

(58) Field of Classification Search
 CPC ........ B23F 23/00; B23F 23/1237; B23F 9/00; B23F 19/107; B23F 19/105; B23F 19/12;
 (Continued)

(56) References Cited

U.S. PATENT DOCUMENTS

| 4,068,558 A * | 1/1978 | Loos ...................... B23F 19/10 |
| | | 407/27 |
| 7,377,731 B1 * | 5/2008 | Arvin ..................... B23F 19/12 |
| | | 409/11 |

(Continued)

FOREIGN PATENT DOCUMENTS

| DE | 4200418 C1 | 12/1992 |
| EP | 1598137 B1 | 6/2007 |

(Continued)

OTHER PUBLICATIONS

Search Report for Application No. EP18153423.1, dated Jul. 5, 2018, 7 pages.

*Primary Examiner* — Nicole N Ramos
(74) *Attorney, Agent, or Firm* — McCarter & English, LLP (57) ABSTRACT

A method for deburring bevel gears using a deburring tool, which comprises at least one cutting edge, having the following steps:

rotationally driving the deburring tool around a deburring spindle axis, rotationally driving a bevel gear around a workpiece spindle axis, wherein the rotational driving of the deburring tool and the rotational driving of the bevel gear take place in a coupled manner with an inverse coupling transmission ratio, it is a continuous method for deburring, in which the cutting edge executes a relative flight movement in relation to the bevel gear, the relative flight movement is defined by a hypocycloid, and wherein (Continued)

a burr is removed at least on one tooth edge of a tooth gap in the region of the bevel gear toe and/or the bevel gear heel by a cutting contact of the cutting edge with the tooth edge.

15 Claims, 8 Drawing Sheets

(51) Int. Cl.
    *B23F 19/10*         (2006.01)
    *B23F 23/00*         (2006.01)
    *B23F 23/12*         (2006.01)
    *B23F 17/00*         (2006.01)
    *B23F 9/00*          (2006.01)

(52) U.S. Cl.
    CPC .......... *B23F 19/105* (2013.01); *B23F 19/107* (2013.01); *B23F 23/1237* (2013.01)

(58) Field of Classification Search
    CPC ........ B23F 19/102; B23F 19/00; B23F 19/10; B23F 19/104; B23F 17/003; Y10T 409/101113; Y10T 409/101272
    See application file for complete search history.

(56) References Cited

U.S. PATENT DOCUMENTS

| | | | |
|---|---|---|---|
| 8,388,281 B2* | 3/2013 | Hunecke | B23F 21/223 409/26 |
| 2004/0109735 A1* | 6/2004 | Arvin | B23F 19/104 409/12 |
| 2007/0020058 A1* | 1/2007 | Peiffer | B23F 9/10 409/8 |
| 2012/0155980 A1* | 6/2012 | Ronald | B23F 17/006 409/8 |
| 2013/0022424 A1* | 1/2013 | Hsiao | B23F 21/226 409/8 |
| 2016/0040769 A1* | 2/2016 | Topfer | B23F 1/00 74/459.5 |
| 2017/0261068 A1 | 9/2017 | Zhao et al. | |
| 2018/0085839 A1* | 3/2018 | Yoon | B23F 19/102 |
| 2018/0257158 A1* | 9/2018 | Lohmann | B23Q 39/04 |

FOREIGN PATENT DOCUMENTS

| | | |
|---|---|---|
| EP | 2181789 A1 | 5/2010 |
| WO | 9205004 A1 | 4/1992 |

* cited by examiner

METHOD FOR DEBURRING BEVEL GEARS AND CNC GEAR-CUTTING MACHINE HAVING CORRESPONDING SOFTWARE FOR DEBURRING

CROSS-REFERENCE TO RELATED APPLICATIONS

This application claims the benefit under 35 U.S.C. § 119(e) to European patent application no. EP 18 153 423.1 filed Jan. 25, 2018, which is hereby expressly incorporated by reference as part of the present disclosure.

FIELD OF THE INVENTION

The present disclosure relates to methods for deburring bevel gears and CNC gear-cuttings machine which are equipped with corresponding software for deburring.

BACKGROUND

In the manufacturing of bevel gears, a burr (also referred to as a primary burr here) can arise, for example, at the outer tooth end due to the cutting machining. Because of the high risk of injury, but also because of the risk of complete hardening when hardening the bevel gears, these tooth edges are frequently broken by a chamfer in the scope of chamfering/deburring.

Figure 1A:
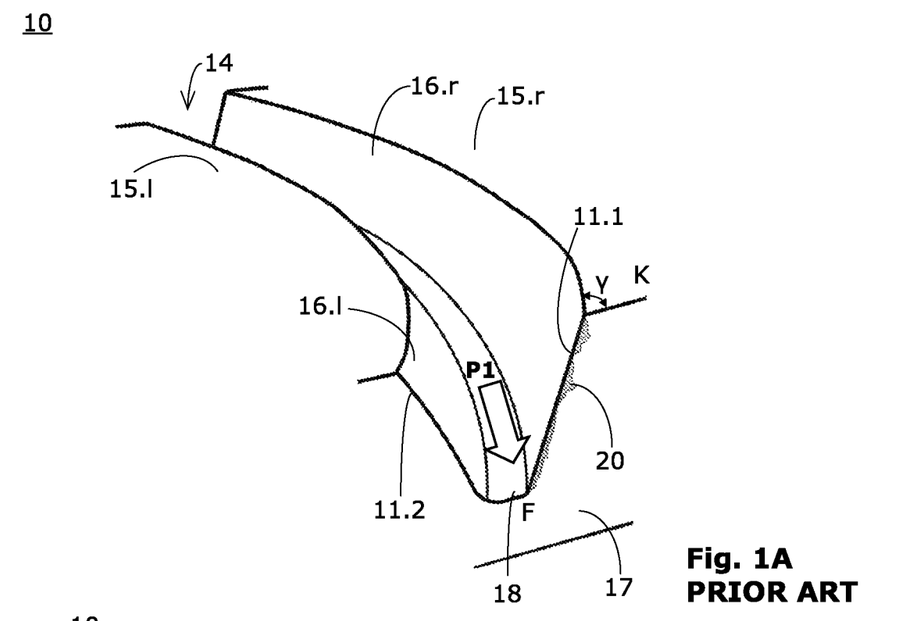
FIG. 1A schematically shows a perspective view of a known bevel gear (a crown wheel here), wherein a single tooth gap is indicated, on the tooth edge of which primary burr has formed.

In the described chamfering, depending on the constellation, a secondary burr can result on the bevel gear upon the removal of the primary burr. If the primary deburring is performed using a deburring tool, the cutting edge(s) of which are guided outward coming out of a tooth gap, the secondary burr thus results on the outer circumference of the bevel gear, as shown in FIG. 1A. In contrast, if the deburring tool is guided from the base F to the head K of the bevel gear 10 (into a tooth gap 14) during the primary deburring, the secondary burr thus results in the functional region of the bevel gear 10. In mass production, the primary deburring is therefore carried out in most cases from the inside to the outside, as symbolized in FIG. 1A by the block arrow P1.

A corresponding example is shown in FIG. 1A. A primary burr primarily occurs at the tooth edge 11.1 of the concave flank 16.r, since this flank 16.r generally forms a relatively acute angle γ with the rear face 17 of the bevel gear tooth 10. If only the primary burr 20 were removed at this tooth edge 11.1 (for example, by using a brush), a very sharp tooth edge 11.1 would remain standing. Therefore, a chamfer is usually created at least in the region of the tooth edge 11.1 by chamfering.

Figure 1B:
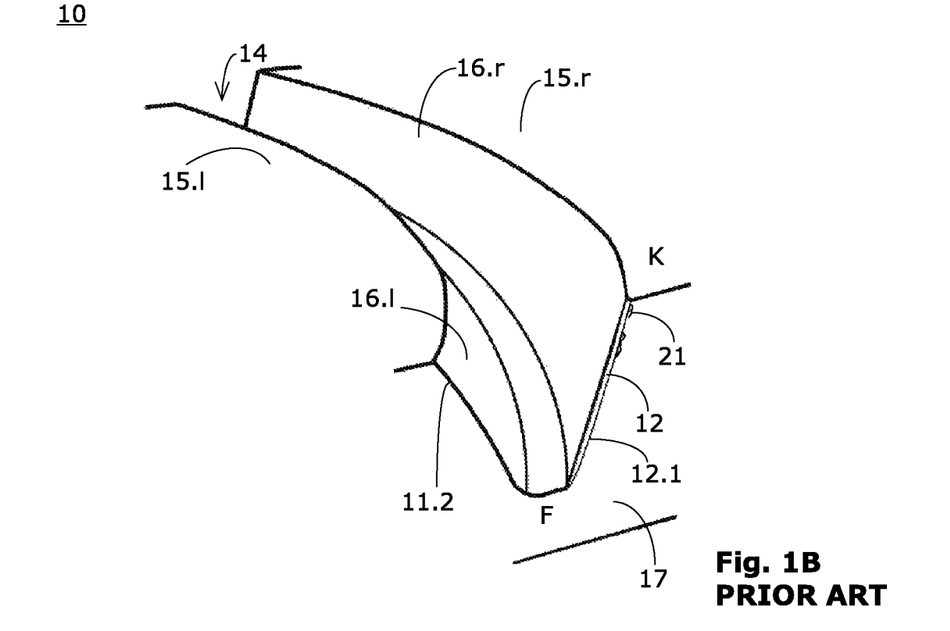
FIG. 1B schematically shows a perspective view of the bevel gear of FIG. 1A, after a chamfer has been created on the tooth edge by deburring, wherein secondary burr has formed on the newly resulting chamfer in the upper region.

The situation after the chamfering of the tooth edge 11.1 is shown in FIG. 1B on the basis of the bevel gear 10 of FIG. 1A. The profile of the first chamfer 12 can be schematically seen in FIG. 1B. As can also be seen in FIG. 1B, a secondary burr 21 can form along the first chamfer 12.

However, secondary burr 21 does not always occur. Relationships have been shown here, for example, with the quality of the cutting edges of the deburring tool. As long as the deburring tool has sharp cutting edges, the primary deburring runs relatively reliably. As cutting edges become blunter, the material of the bevel gear 10 is no longer cut, but rather displaced. In this case, the tendency toward forming secondary burr increases. Since the tooth edge typically does not have a linear profile between bevel gear teeth 15.r, 15.1 and, for example, the heel Fe of the bevel gear 10, the thickness of the chips to be removed during the chamfering varies. For this reason, secondary burrs can sometimes arise.

In contrast, if one moves the deburring tool into a tooth gap 14 during the deburring, the secondary burr can thus arise in the functional region of the bevel gear 10. This approach is therefore not readily selected in mass production.

There is a further aspect which can have a significant influence on the deburring. To be able to perform the deburring in a continuously running procedure, a fixed positive coupling of the rotational movements of the deburring tool and the bevel gear 10 is required. Depending on the type of drive of the deburring tool (a belt drive is sometimes used here), however, it can occur that the rotational movement of the deburring tool begins to lag. This can occur above all if excessively large cutting forces occur on the deburring tool during the deburring. The positive coupling now causes the deburring tool to eat farther into the material of the bevel gear in the event of lagging of the deburring tool, however. In the case of lagging, the deburring tool attempts to cut a chamfer which becomes larger and the cutting forces increase further. This effect can result in destruction of the deburring tool.

There is still a further aspect which plays an important role in bevel gear manufacturing. Because of economic boundary conditions, the bevel gear manufacturing—at least if it relates to mass production—is to be optimized in all its sequences, on the one hand, to use resources carefully and, on the other hand, to be able to machine as many bevel gears as possible per unit of time.

The deburring described at the outset is a partial process of bevel gear manufacturing. There also appears to be potential for further improvements of the sequences in this partial process.

Therefore, on the one hand, the need exists to deburr bevel gears reliably and safely. Especially in the mass production of bevel gears—for example, in automobile construction—the problems which result in conjunction with primary burr and secondary burr have to be avoided.

On the other hand, the need exists to make the deburring more efficient.

SUMMARY

It is therefore an object to provide a method for deburring bevel gears and a CNC bevel gear gear-cutting machine having corresponding software, so that deburring can be carried out with low effort and as efficiently as possible, without destroying the deburring tool.

This object is achieved according to at least some embodiments by a method for deburring bevel gears, in which a deburring tool, such as a deburring cutterhead, having at least one cutting edge is used. The method comprises the following steps:

rotationally driving the deburring tool around a deburring spindle axis, rotationally driving a bevel gear around a workpiece spindle axis, wherein the rotational driving of the deburring tool and the rotational driving of the bevel gear take place in a coupled manner with an inverse coupling transmission ratio, this is a continuous method for deburring, the deburring tool executes a relative flight movement in relation to the bevel gear, the relative flight movement is defined by a hypocycloid, and wherein a burr is removed at least on one tooth edge of a tooth gap in the region of the bevel gear heel and/or the bevel gear toe by a cutting contact of the cutting edge with the tooth edge.

In at least some embodiments, the relative flight movement of the cutting edge leads into a tooth gap of the bevel gear, i.e., the deburring is carried out by a relative flight movement from the outside to the inside.

In at least some embodiments, the cutting edge executes a relative flight movement in relation to the bevel gear having a movement direction which leads out of the tooth gap of the bevel gear.

In the deburring of bevel gear pinions, a relative flight movement having a movement direction of the cutting edge which leads from the tooth base to the tooth head is carried out.

In the deburring of bevel gear crown wheels, a relative flight movement having a movement direction of the cutting edge which leads from the tooth head to the tooth base is carried out.

In at least some embodiments, a hypocycloid coupling is used as the inverse coupling transmission ratio. Such a hypocycloid coupling has the advantage that, on the one hand, the deburring is carried out from the outside to the inside and, on the other hand, the flight movement of the cutting edge has a clear twist. I.e., the deburring is carried out so that the cutting edge moves out of the (collision) region of the bevel gear on a steep flight path after the deburring.

In at least some embodiments, a hypocycloid coupling having an inverse coupling transmission ratio is used, which results from the number of teeth of the bevel gear and the number of threads of the deburring tool.

In at least some embodiments, a deburring milling cutter, for example, a one-piece deburring milling cutter, a deburring cutterhead having cutter plates, or a deburring cutterhead having bar cutters is used as the deburring tool.

In at least some embodiments, the relative flight movement of the cutting edge leads into a tooth gap of the bevel gear, wherein a cutting contact of the cutting edge with a tooth edge of the tooth gap of the bevel gear occurs, and wherein the burr is removed in the region of this edge by this cutting contact.

In at least some embodiments, the relative flight movement of the cutting edge is oriented so that after the cutting contact, the tooth edge moves away in relation to the cutting edge. This has the advantage that in the case of a trailing deburring tool, the cutting edge of the deburring tool does not automatically eat farther into the material of the bevel gear.

In at least some embodiments, the deburring is carried out after the bevel gear has been machined by milling, grinding, pounding, or peeling.

In at least some embodiments, the deburring is carried out so that a chamfer is created along the tooth edge during the removal of the burr.

In at least some embodiments, the relative flight movement of the cutting edge is oriented so that a chamfer which becomes smaller automatically results during the deburring, because of the inverse coupling transmission ratio, if the deburring tool begins to lag.

At least one deburring cutterhead is used as the deburring tool in at least some embodiments. Deburring tool is used as the more general term hereafter, wherein the phrase deburring tool can be replaced in each case by the phrase deburring cutterhead if not explicitly mentioned otherwise.

A CNC machine (for example, a bevel gear gear-cutting machine) having a deburring device having a deburring spindle and a software module which is programmed accordingly is used for deburring in at least some embodiments.

Deburring cutterheads, which are equipped with cutter inserts (for example, in the form of bar cutters) made of hard metal, are used in at least some embodiments. The use of hard metal inserts offers degrees of freedom in the design of the cutting edges of these cutter inserts.

It is an advantage of at least some embodiments that a corresponding bevel gear gear-cutting machine is flexibly usable, and the deburring takes place reliably.

Advantages of at least some embodiments are that nearly arbitrarily shaped profile edges of bevel gears are achievable using the cutting edge or edges of the deburring tool using the axes (NC axes), which are numerically controllable by means of a software module and a CNC controller, of a CNC machine (for example, a bevel gear gear-cutting machine).

At least some embodiments may be implemented particularly advantageously in a 6-axis, CNC-controlled bevel gear gear-cutting machine, which comprises a deburring device, to which at least one additional axis is allocated. At least one linear axis and a deburring spindle axis are associated with the deburring device in at least some embodiments.

This summary is not exhaustive of the scope of the present aspects and embodiments. Thus, while certain aspects and embodiments have been presented and/or outlined in this summary, it should be understood that the present aspects and embodiments are not limited to the aspects and embodiments in this summary. Indeed, other aspects and embodiments, which may be similar to and/or different from, the aspects and embodiments presented in this summary, will be apparent from the description, illustrations and/or claims, which follow.

It should also be understood that any aspects and embodiments that are described in this summary and do not appear in the claims that follow are preserved for later presentation in this application or in one or more continuation patent applications.

BRIEF DESCRIPTION OF THE DRAWINGS

Other advantages and features will become apparent from the following detailed description, which are to be understood not to be limiting, and are described in more detail below with reference to the drawings.

DETAILED DESCRIPTION

A schematic perspective view of a bevel gear 10 is shown in FIGS. 1A and 1B, wherein exemplary steps of a conventional deburring method have been explained on the basis of these two figures. The elements and terms which are used herein are also defined on the basis of FIGS. 1A and 1B.

Figure 2:
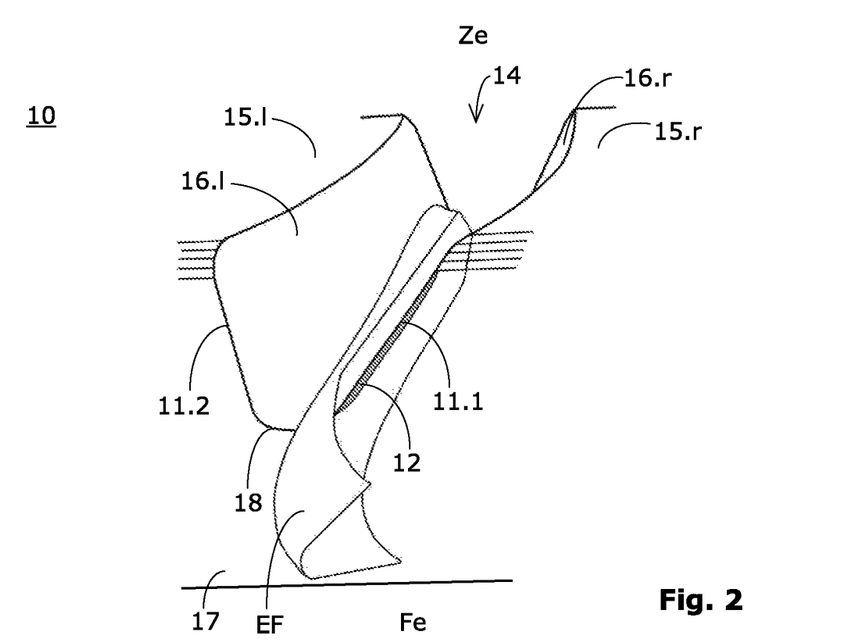
FIG. 2 schematically shows a perspective view of a crown wheel bevel gear, which is deburred, wherein a section of the flight path of the deburring tool is shown by its envelope.

FIG. 2 shows a schematic perspective view of another bevel gear 10 (a crown wheel here), which is deburred according to one embodiment.

In each of the mentioned figures, only a part of the main body of a bevel gear pinion 10 can be seen in schematic form. A single tooth gap 14 is indicated in the material of the main body. The examples shown are bevel gears 10 having curved flank longitudinal line, as can be seen from the profile of the teeth 15.r and 15.1. The bevel gears 10 of FIGS. 2 and 4A to 4E have a flank longitudinal line curve to the right (right spiral) and the bevel gear 10 of FIG. 3 has a flank longitudinal line curve to the left (left spiral).

At least some embodiments may be applied not only to spiral-toothed bevel gears 10, but rather also to other bevel gears 10, cylindrical spur gears, beveloids, crown gears, and also to inner gear teeth.

The bevel gear pinion 10 has a main body in each of the examples shown, which is defined by two truncated cones having corresponding cone lateral surfaces. These cone lateral surfaces, to be precise, are truncated cone lateral surfaces. The two truncated cones are arranged coaxially to the workpiece spindle axis B. The workpiece spindle axis B can be seen in FIG. 7.

The teeth 15.r and 15.1 of the bevel gear 10 extend along the head truncated cone lateral surface. The truncated cone lateral surface identified with the reference sign 17 in FIGS. 2, 3, and 4A-4E is also identified here as the (ring-shaped) heel-side lateral surface 17. In bevel gears 10, the terms bevel gear toe Ze or simply toe Ze and bevel gear heel Fe or base Fe are also used. The toe Ze of the bevel gear 10 is located in FIGS. 2, and 4A-4E at the upper end of the tooth gap 14 and the heel Fe is located on the side of the truncated cone lateral surface 17 (at the lower end of the tooth gap 14 here).

For example, in the transition region from the teeth 15.r and 15.1 to the truncated cone lateral surface 17, primary burrs 20 can arise during the cutting machining (referred to here as gear-cutting or gear-cutting machining) (see FIG. 1A), as already described. In the transition region of the concave tooth flank 16.r to the truncated cone lateral surface 17, a first tooth edge 11.1 (also called the first profile edge) results during the gear cutting and in the transition region of the convex tooth flank 16.1 to the truncated cone lateral surface 17, a second tooth edge 11.2 (also called the second profile edge) results during the gear cutting.

The burrs 20 form above all at the concave tooth flanks 16.r in the region of the heel Fe and at the convex tooth flanks 16.1 in the region of the toe Ze. However, it is to be noted that burrs 20 can occur both at the tooth flanks and also at the tooth base 18 of a tooth gap 14.

Figure 7:
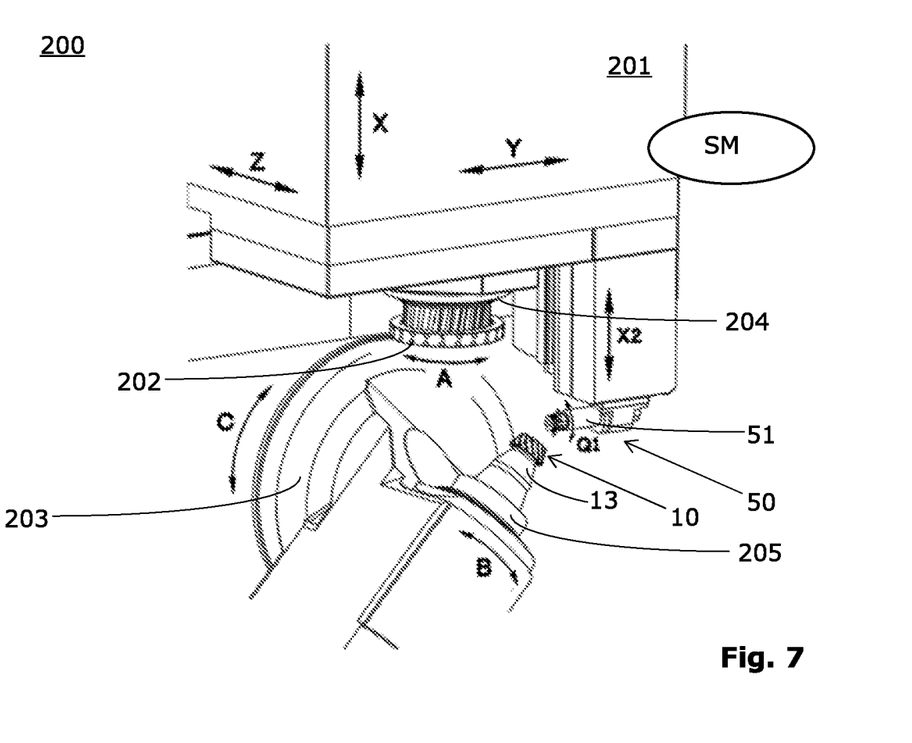
FIG. 7 shows a perspective partial view of a gear-cutting machine equipped with a deburring device.

To now be able to remove the burr 20, the bevel gear 10 is deburred in a bevel gear gear-cutting machine 200 (see, for example, FIG. 7). According to at least some embodiments, the deburring comprises the following steps, for example:

rotationally driving the deburring tool 40 around a deburring spindle axis Q1 (see, for example, FIG. 7), rotationally driving the bevel gear 10 around a workpiece spindle axis B (see, for example, FIG. 7).

The rotational driving of the deburring tool 40 and the rotational driving of the bevel gear 10 is carried out in a coupled manner using an inverse coupling transmission ratio in at least some embodiments. The coupling transmission ratio can be defined, for example, as the ratio of the rolling circle radius r to the base circle radius R.

In addition, it is to be noted that it is a continuous method for deburring, in which the at least one cutting edge 41 of the deburring tool 40, in relation to the bevel gear 10, executes a relative flight movement having a movement direction of the cutting edge 41 from the base F to the head K (deburring from the outside to the inside into the tooth gap 14) or from the head K to the base F (deburring from the inside to the outside out of the tooth gap 14), wherein the flight movement is mathematically defined by a hypocycloid Hy in three-dimensional space.

In the scope of the continuous deburring method, a chamfer 12 is created at least on one tooth edge (for example, on the tooth edge 11.1 or 11.2) of a tooth gap 14, for example, in the region of the heel Fe by a cutting contact of the cutting edge 41 with the tooth edge 11.1 or 11.2 (this chamfer 12 is colored gray in FIG. 2, in order to be able to emphasize it clearly). Specifically, in the example shown in FIG. 2, the tooth edge 11.1 of the concave tooth flank 16.6 is deburred in the heel region Fe of the bevel gear 10.

Neither the deburring tool 40 nor a cutting edge 41 of the deburring tool 40 are shown in FIG. 2. Instead, FIG. 2 shows the flight path of the cutting edge 41, or of the cutting head 63, respectively, in the form of an envelope surface EF. This envelope surface EF coils or winds through the tooth gap 14 from the outside to the inside.

A deburring cutter 61 is shown in schematic form in five different positions in FIGS. 4A-4E. For the sake of simplicity, the deburring cutter 61 only comprises a rectangular cutter shaft 62 and a cutting head 63 here. A part of the edge 11.1, which is to be deburred, is shown by a gray area in FIGS. 4A-4D. This edge 11.1 penetrates the envelope EF to a certain extent.

Figure 4A:
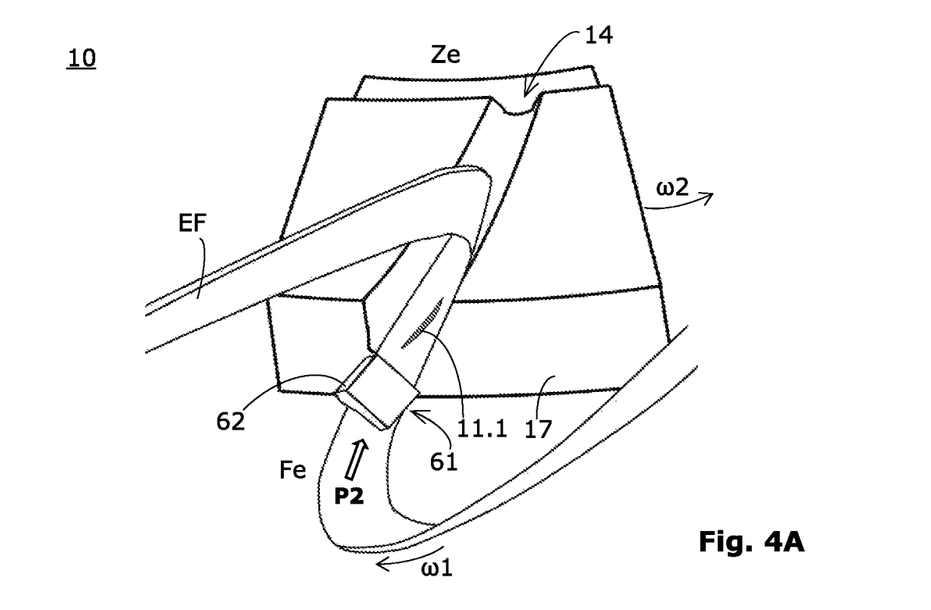
FIG. 4A schematically shows a perspective view of another crown wheel bevel gear during deburring using a single deburring cutter at a time t=t0.
Figure 4B:
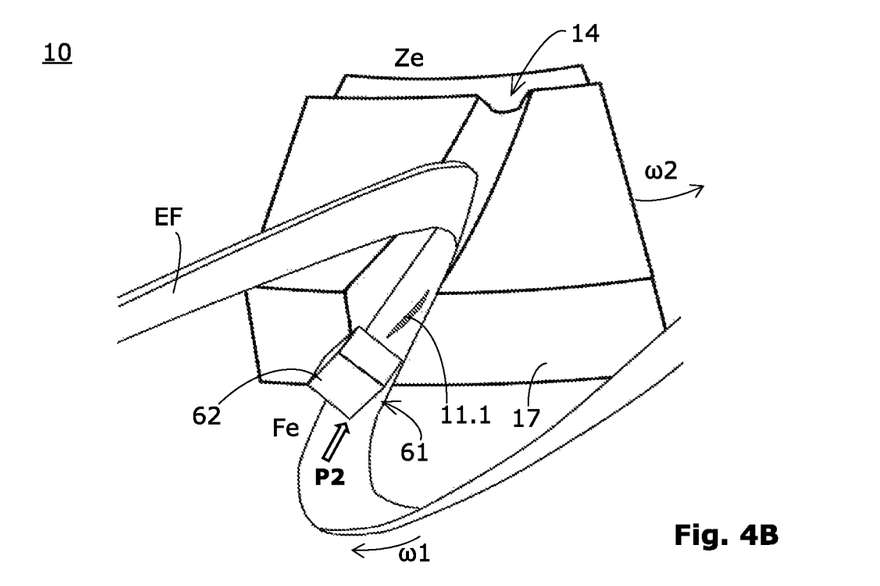
FIG. 4B schematically shows a perspective view of the bevel gear and the deburring cutter of FIG. 4A at a time t=t1.
Figure 4C:
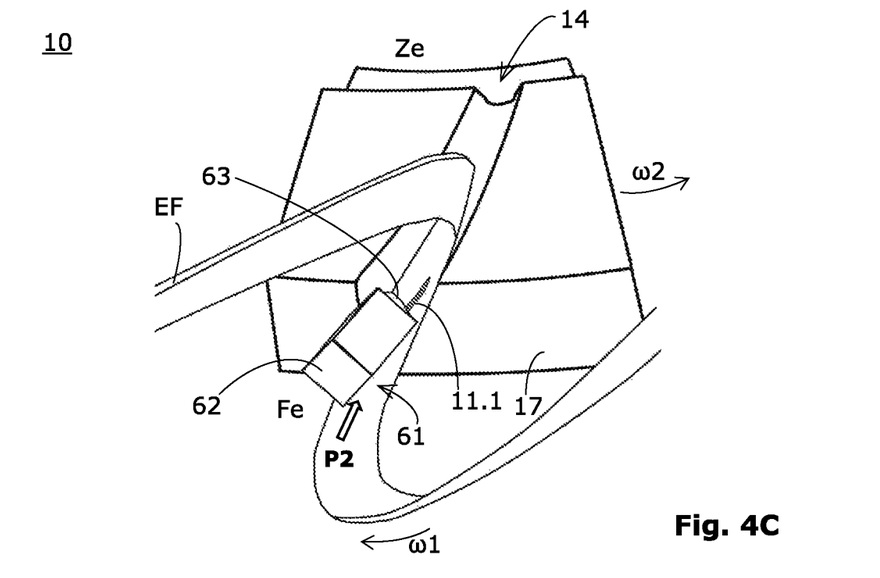
FIG. 4C schematically shows a perspective view of the bevel gear and the deburring cutter of FIG. 4A at a time t=t2.

Since the deburring cutter 61 is guided from the outside to the inside into the tooth gap 14 in this embodiment, in FIG. 4A, the deburring cutter 61 is located shortly before the tooth gap 14 at the time t=t0 (see FIG. 4A) and at the time t=t1 (see FIG. 4B). FIG. 4C shows the deburring cutter 61 at the time t=t2, wherein it begins to remove a burr on the edge 11.1, or to generate a chamfer, respectively, at approximately this time.

Figure 4D:
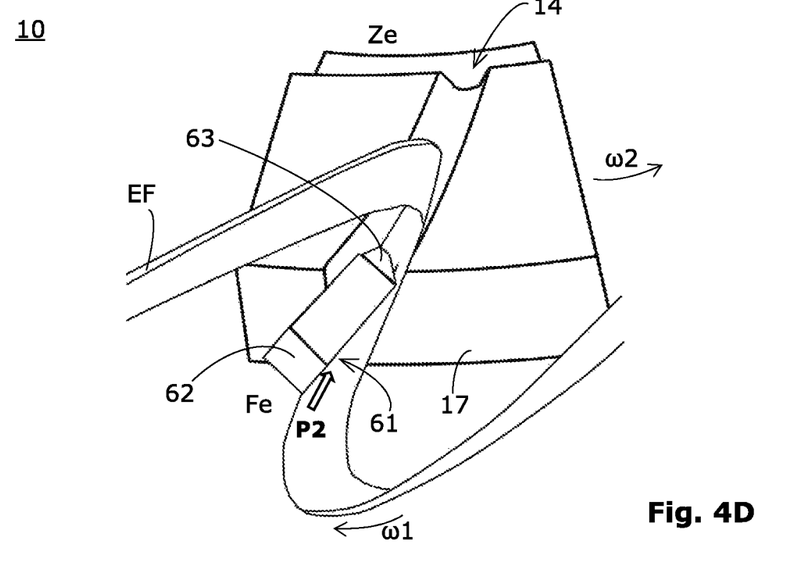
FIG. 4D schematically shows a perspective view of the bevel gear and the deburring cutter of FIG. 4A at a time t=t3.
Figure 4E:
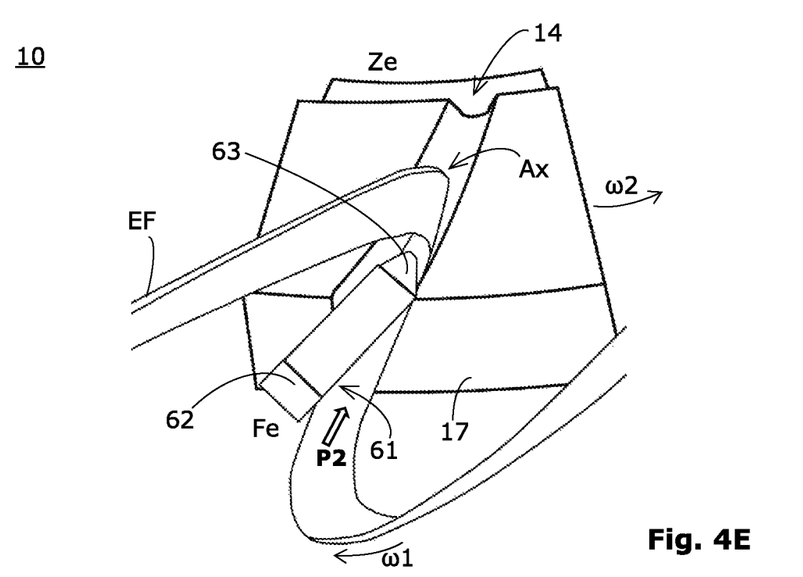
FIG. 4E schematically shows a perspective view of the bevel gear and the deburring cutter of FIG. 4A at a time t=t4.

The state at the time t=t3 is shown in FIG. 4D. The edge 11.1 was already nearly completely deburred. The state at the time t=t4 is shown in FIG. 4E. The edge 11.1 was completely deburred and the deburring cutter 61 approaches a reversal point (apex Ax of a loop of the hypocycloid Hy). Upon reaching this reversal point, the deburring cutter 61 begins to wind upward out of the tooth gap.

The instantaneous movement direction is indicated by the block arrow P2 in each of FIGS. 4A to 4E. In this exemplary embodiment, the edge 11.1 is deburred from the tooth base toward the tooth head.

As already mentioned, this is a continuous deburring procedure. A continuous deburring procedure is a procedure in which the bevel gear 10 and the deburring tool 40 rotate coupled in engagement with one another. The bevel gear 10 rotates in this case around the workpiece spindle axis B and the deburring tool 40 rotates around the deburring spindle axis Q1. I.e., there is a movement coupling (kinematic coupling) between the bevel gear 10 and the deburring tool 40. During the deburring, the deburring tool 40 and the bevel gear 10 rotate with a coupling transmission ratio exactly adapted to one another.

In at least some embodiments, an electronic coupling is used between the two rotational drives of the bevel gear 10 and the deburring tool 40.

In at least some embodiments, an inverse coupling transmission ratio is used and the tool track (also referred to as the flight path here), which a cutting head 63 of a deburring cutter 61 describes in three-dimensional space, follows a hypocycloid Hy. FIGS. 2 and 4A-4E show a short section of a hypocycloid flight path (illustrated by its envelope EH), as already mentioned.

The coupling transmission ratio is selected so that a first deburring cutter 61 of the deburring tool 40 is moved, for example, from the outside to the inside through a first tooth gap 14 of the bevel gear 10. A second deburring cutter 61 of the deburring tool 40 is moved from the outside to the inside, for example, through the next tooth gap 14 of the bevel gear 10, etc.

In at least some embodiments, the cutting edges 41 are on a circle on the deburring tool 40. The cutting wedge (referred to as cutting head 63 here) is placed on the bar-shaped shaft 62 of the deburring cutter 61 so that a reasonable rake angle and positive clearance angles result.

Figure 3:
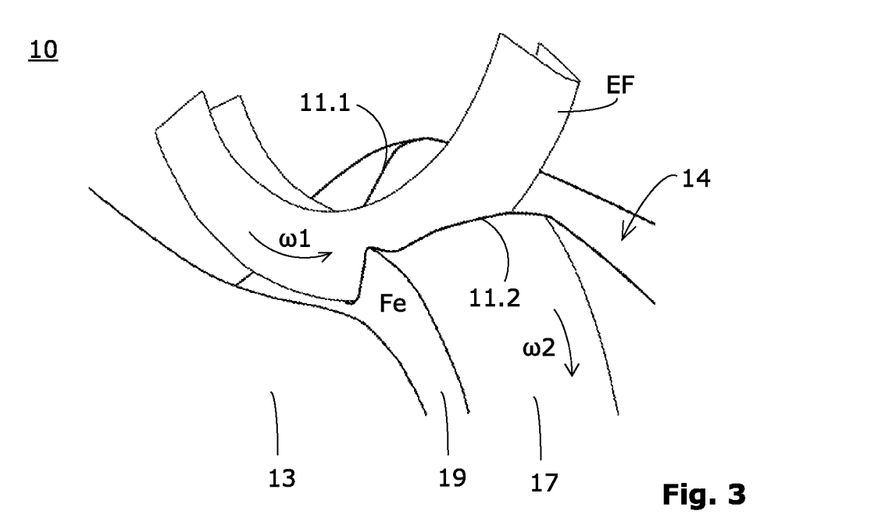
FIG. 3 schematically shows a perspective view of a bevel gear pinion, which is deburred, wherein a section of the flight path of the deburring tool is shown by its envelope.

A further embodiment is shown in FIG. 3. A part of a bevel gear 10 (a pinion here) looking toward the rear cone 19 or toward the heel side Fe is shown. In FIG. 3, a part of a clamping device 13 can also be seen, which is used to fasten the bevel gear 10 on a workpiece spindle 205 of the machine 200.

As indicated in FIGS. 2, 3, and 4A-4E, the deburring cutter 61 of the deburring tool 40 follows a hypocycloid flight path, which is coiled or twisted per se. I.e., the deburring tool 40 completes a rotational movement which is twisted per se around the deburring spindle axis Q1 with its deburring cutters 61 because of the strong twisting of the hypocycloid flight path (if one proceeds from the point of view of a resting, non-rotating bevel gear 10).

Figure 5:
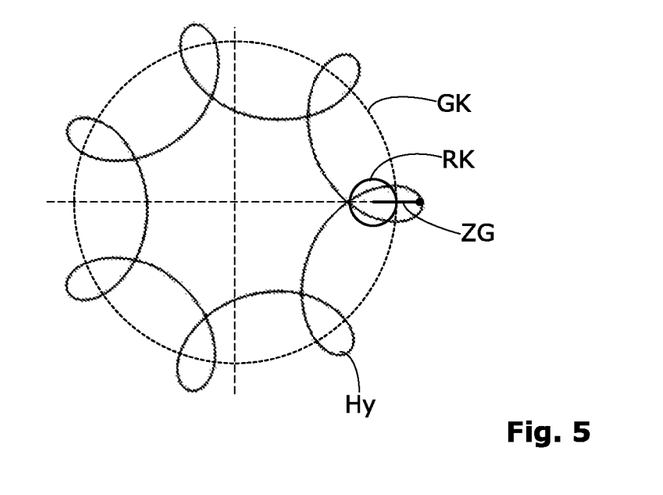
FIG. 5 schematically shows a hypocycloid.

In contrast to an epicycloid, which is generated by rolling a rolling circle on the outside of a base circle, a hypocycloid Hy is generated by rolling a rolling circle RK on the inside in a base circle GK (details can be inferred from FIG. 5). If one compares an epicycloid to a hypocycloid HY and if both were generated using the same parameters, it thus becomes apparent that the hypocycloid HY has a greater number of revolutions (number of loops) per full circle of the base circle GK than the corresponding epicycloid (having identical base circle and rolling circle radii). It necessarily results therefrom that the hypocycloid HY has a stronger curvature in the region of the loops than the corresponding epicycloid.

In at least some embodiments, the parameters of the hypocycloid HY are selected so that the hypocycloid HY has multiple loops which face radially outward, while the loops face radially inward in the epicycloid.

A hypocycloid Hy is shown as an example in FIG. 5. The following parameters were used to generate this hypocycloid Hy: R=6×r; pointer length (also called flight circle radius) =2×r (R is the radius of the base circle GK and r is the radius of the rolling circle RK). The pointer is identified in FIG. 5 with ZG. Since the pointer ZG has a pointer length which is greater than the radius r, the hypocycloid Hy of FIG. 5 is an extended hypocycloid Hy. Overall, this hypocycloid Hy shown by way of example comprises seven loops, which face radially outward. In practice, the parameters for the definition of the hypocycloid Hy are often selected so that the loops do not already repeat after one complete revolution. The envelope of FIGS. 4A to 4E can represent, for example, a part of a loop of FIG. 5.

In FIG. 3, the strong curvature of the flight path can be seen on the basis of a further bevel gear 10 (a pinion here). Specifically, a short section of the envelope EH of the flight path is shown in FIG. 3. The bevel gear 10 is shown diagonally from below here. A part of the clamping device 13 and the end face 19 on the heel Fe of the bevel gear 10 can be seen. Furthermore, it can be seen how a tooth gap 14 exits from the material of the bevel gear 10 in the region of the truncated cone lateral surface 17. The two tooth edges 11.1 and 11.2 are located in this region.

The envelope EH shown essentially describes the movement of the cutting head 63 from outside the tooth gap 14 into the tooth gap 14. It can be seen clearly in FIG. 3 that the flight path has a strong curvature because of a relatively small radius. Because of this, the deburring cutter 61 moves out of the tooth gap 14 shortly after the cutting contact. Moreover, it can be inferred from FIG. 3 that the deburring occurs here from the base F to the head K, and the cutting edge 41 of the cutting head 63 moves away from the deburred tooth edge 11.2 and out of the tooth gap 14 immediately after the cutting contact.

As already described, a portion of a further bevel gear 10 during the deburring is shown in FIGS. 4A to 4E. The deburring cutter 61 moves from right to left along the hypocycloid flight path, as shown by the envelope EH extending in a helix.

To be able to better illustrate the movement sequences and the relationships, the rotational directions of the deburring tool 40 and the bevel gear 10 are indicated by the curved arrows ω1 and ω2.

In the exemplary embodiment having tooth gaps 14 extending in a left spiral shown in FIG. 3, the bevel gear 10 is rotationally driven counterclockwise (this rotational direction is observed in the viewing direction of the workpiece spindle axis B in relation to the bevel gear 10) and the deburring tool 40 is rotationally driven clockwise (this rotational direction is also observed in the viewing direction of the workpiece spindle axis B). The rotational direction ω2 leads in relation to the rotational direction ω1. This relative orientation of the two rotational directions ω1 and ω2 is referred to here as inverse coupling. An inverse coupling of the two rotational directions ω1 and ω2 is also shown in FIGS. 4A-4E. In both cases, this is an inverse coupling for the guiding of the deburring tool 40 from the outside to the inside along a hypocycloid flight path.

It can be seen here that the tooth edge 11.1 or 11.2 to be deburred moves away from the envelope EH due to the inverse coupling. If the deburring tool 40 should lag, the cutting edge 41 of the cutting head 63 thus would not eat deeper into the material of the bevel gear 10.

If a procedure for deburring from the inside to the outside is selected, the deburring tool 40 is then guided out of the tooth gap 14 outward along a hypocycloid flight path. If one maintains the movement direction ω2 of FIGS. 4A-4E, the movement direction ω1 then has to be reversed to still achieve inverse coupling.

In the illustrations of FIGS. 2, 3, 4A-4E, and 5, it is to be noted that they are shown from the viewpoint of a resting, nonrotating bevel gear workpiece 10. I.e., in FIG. 5, the base circle GK rests and the rolling circle RK rolls on the inside along the base circle GK. In this case, the pointer ZG draws the hypocycloid Hy in the plane of the drawing.

In a CNC gear-cutting machine 200, as shown in FIG. 7, for example, the required relative movements are generated, for example, in that the center point of the rolling circle RK is fixed in space, while the base circle GK rotates. The rolling circle RK rolls in the interior of the base circle GK, and a hypocycloid HY is generated in relation to the rotating bevel gear 10.

The inverse coupling or the coupling transmission ratio, respectively, is selected so that a brief cutting contact only occurs in each case in the region of the tooth edges to be deburred (11.1 or 11.2) between the deburring tool 40 and the bevel gear 10. The coupling transmission ratio is defined by the ratio of the two radii R and r.

Figure 6A:
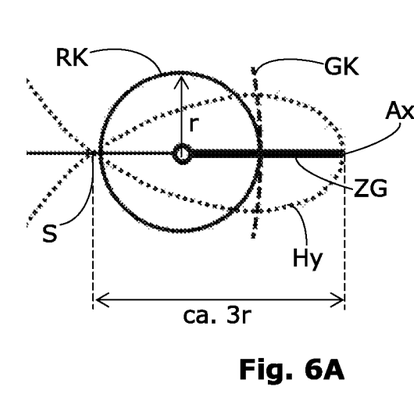
FIG. 6A shows a detail of a loop of the hypocycloid of FIG. 5.
Figure 6B:
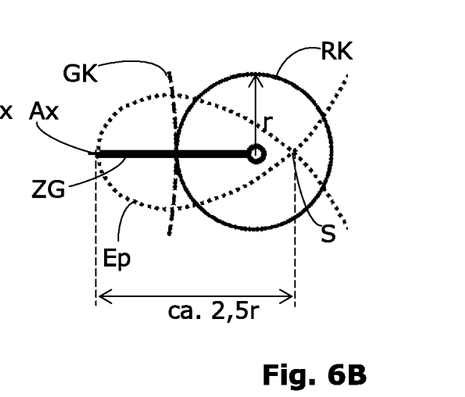
FIG. 6B shows a detail of an epicycloid generated using the same parameters as the hypocycloid of FIG. 5.

In at least some embodiments, the inverse coupling transmission ratio is selected so that the hypocycloid flight path has a longer extension in the region of the loops in comparison to an epicycloid flight path which was generated using the same parameters. This will be explained further hereafter on the basis of an exemplary comparison of the loops of a hypocycloid Hy and an epicycloid Ep. In FIG. 6A, one of the loops of the hypocycloid Hy of FIG. 6A is shown in an enlarged illustration. This hypocycloid Hy was generated using the following parameters: R=6×r; pointer length=2×r. One of the loops of an epicycloid Ep is shown in an enlarged illustration in FIG. 6B. This epicycloid Ep was generated using the same parameters. As already mentioned, the loops of the hypocycloid Hy face radially outward (in relation to the base circle GK), while in contrast the loops of the epicycloid Ep face radially inward (in relation to the base circle GK). It can be seen in the comparison of FIGS. 6A and 6B that the loop of the hypocycloid Hy has a longitudinal extension (measured from the apex Ax to the intersection S) parallel to the horizontally extending axis which is approximately 3 r. The longitudinal extension of the loop of the epicycloid Ep is clearly shorter (it is approximately 2.5 r). For practical applications, this means that the cutting edge 41 of the deburring cutter 61 moves away faster and farther from the bevel gear 10 after the cutting contact than would be the case with a corresponding epicycloid. Collisions are thus avoided.

FIG. 7 shows a perspective illustration of the basic structure of a CNC gear-cutting machine 200, which is designed for the gear cutting and deburring of spiral-toothed bevel gears 10. Such a machine 200 is designed or refitted according to at least some embodiments so that deburring of the bevel gear 10 can be performed by means of a deburring tool 50, which bears a deburring tool 40 on a deburring spindle 51.

However, the principle of at least some embodiments may also be applied to other CNC gear-cutting machines 200 which are equipped with a deburring device 50, as shown in FIG. 7, for example.

The CNC gear-cutting machine 200 can be constructed as follows. The machine 200 can comprise a machine housing 201, which enables it to guide a tool spindle 204 linearly vertically along a coordinate axis X (first axis), linearly horizontally along a coordinate axis Y (second axis), and linearly horizontally along a coordinate axis Z (third axis). The mentioned tool spindle 204 can be arranged hanging on the machine 200, for example, wherein the corresponding tool spindle axis A (fourth axis) hangs vertically in space.

The tool spindle 204 bears a tool, a cutterhead 204 having multiple bar cutters here by way of example (the bar cutters are not visible).

A first pivot device 203 can be provided on the machine 200, for example, which bears a workpiece spindle 205 having a workpiece spindle axis B (fifth axis). The workpiece spindle 205 including workpiece spindle axis B can be pivoted around a pivot axis (C axis; sixth axis) of the first pivot device 203. The pivot axis C is perpendicular to the tool spindle axis A and extends horizontally in space here. If one looks at the machine 200 of FIG. 7 from the front in the direction of the pivot axis C, the workpiece spindle 205 is located inclined in a 14 o'clock position at the moment shown. In this position, for example, a deburring tool 40 of the deburring device 50 can be brought into interaction with the bevel gear workpiece 10.

The workpiece spindle 205 bears a spiral-toothed bevel gear pinion as the workpiece 10 in the example shown. A clamping device 13 can be used for connecting the bevel gear 10 to the workpiece spindle 205.

The first pivot device 203 can be mounted so it is pivotable around the C axis, for example, so that the bevel gear 10 is pivotable into a machining position below the gear-cutting tool 202. Moreover, the bevel gear 10 can be transferred by the first pivot device 203 into a suitable position in relation to the deburring tool 40 of the deburring device 50 for deburring.

Moreover, the deburring device 50 can be provided, for example, with infeed device(s), to be able to move the deburring device 40 in relation to the bevel gear 10 and bring it into interaction therewith.

The infeed device can comprise, for example, in at least some embodiments a linear axis X2, as shown by way of example in FIG. 2.

The deburring device 50 of at least some embodiments, which comprises a deburring cutterhead 40, can comprise, for example, a linear axis X2 (seventh axis) and a deburring spindle axis Q1 (eighth axis) as shown in FIG. 7.

The machine 200 is designed so that in at least some embodiments the bevel gear 10 and the deburring tool 40 can be rotationally driven in an inversely coupled manner, wherein this coupling is defined by a coupling transmission ratio.

Using one or more of the mentioned axes, the deburring tool 40 can be moved into a starting position suitable for the deburring in relation to the bevel gear 10.

The bevel gear 10 is then rotationally driven about the workpiece spindle axis B and the deburring tool 40 is rotationally driven about the deburring spindle axis Q1 in a coupled manner and they are moved in relation to one another. In a continuous method, the cutting edges of the deburring tool 40 (for example, the cutting edges 41 of the deburring cutter 61 of the deburring cutterhead 40) execute corresponding deburring movements from the outside to the inside on the predetermined edges 11.1 and/or 11.2 of the bevel gear 10.

The pivot axis D can also have a different orientation in space in at least some embodiments, however. The specific arrangement of the optional pivot axis D is dependent on the overall configuration of all axes of the machine 200, to move the workpiece 10 and the deburring tool 40 in relation to one another so that a suitable deburring movement can be executed along a hypocycloid Hy.

To be able to implement the chamfering/deburring in the continuous method, bevel gear gear-cutting machines 200 having at least six numerically controlled axes are used in at least some embodiments, as shown by way of example in FIG. 7.

However, other CNC bevel gear gear-cutting machines 200 can also be refitted or equipped according to at least some embodiments, where machines having seven, eight, or nine numerically controlled axes are used, as was already explained on the basis of FIG. 7.

The deburring device 50 comprises, for example, in at least some embodiments a deburring spindle 51 having the above-mentioned deburring spindle axis Q1, which has a horizontal orientation here in the example shown. A deburring tool 40 can be fastened on the deburring spindle 51, as shown in FIG. 7. The deburring tool 40 shown in FIG. 7 is specifically a deburring cutterhead 40, which is equipped with cutter inserts (for example, in the form of bar cutters 61) so that they protrude radially out of the circumference of the deburring tool 40.

In at least some embodiments, the bar cutters 61 are arranged offset slightly diagonally on the deburring cutterhead 40, so that the longitudinal axes of the cutter shafts 62 do not intersect the spindle axis Q1. On the one hand, the individual bar cutters 61 may be fastened better on the deburring cutterhead 40 due to this offset arrangement and, on the other hand, the rake surface on the cutting head 63 can be aligned optimally in relation to the cutting direction.

Numerically controllable axes in this context are axes which are controllable via a programmable controller. The numerically controllable axes are designed and arranged so that by way of the adjustment of at least one of the axes, the workpiece spindle 205 including the bevel gear 10 is movable in relation to the deburring tool 40 so that cutting edges 41 of the deburring tool 40, with simultaneous coupled, inverse rotation of the workpiece spindle 205 around the workpiece spindle axis B and the deburring tool 40 around the deburring spindle axis Q1, plunge in succession from the outside to the inside into tooth gaps 14 of adjacent teeth 15.r, 15.1 of the bevel gear 10 and execute a deburring movement in relation to the predefined tooth edges 11.1, 11.2 of the bevel gear 10.

As indicated in FIG. 7, the deburring spindle axis Q1 of the deburring device 50 can extend, for example, parallel to the Y axis. However, other axis configurations are possible.

According to at least some embodiments, one or more of the numerically controlled axes are used to move the cutting edges 41 of the deburring tool 40 in relation to the workpiece 10.

Since the bevel gear 10 rotates at a predefined first angular velocity $\omega 2$ around the workpiece axis B and the deburring tool 60.1 rotates at a second angular velocity $\omega 1$ around the deburring spindle axis Q1 and since the two rotational movements take place in opposite directions in an (electronically) coupled manner, complex helical flight paths in three-dimensional space result for the cutter inserts 61 of the deburring tool 40, as shown on the basis of the envelope EH.

Figure 8:
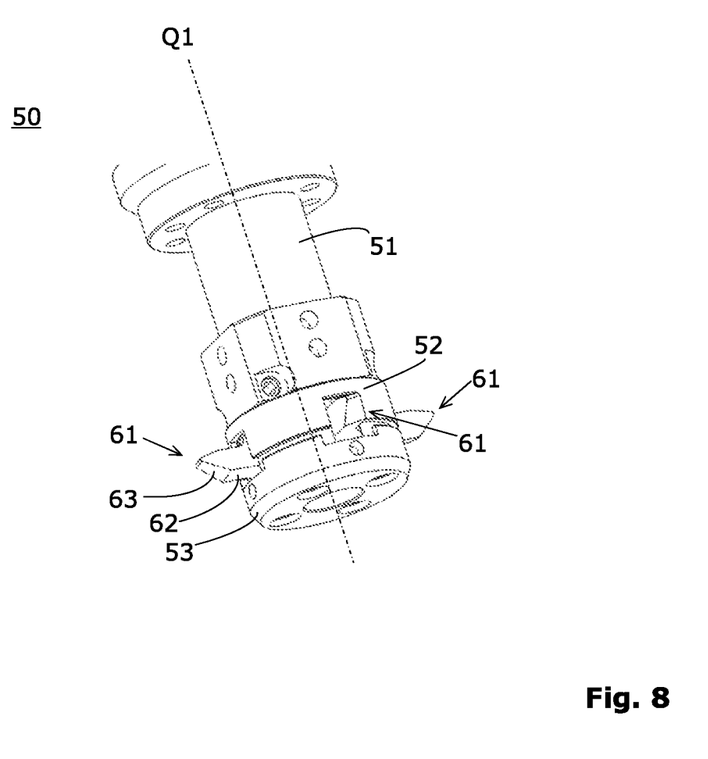
FIG. 8 shows a perspective view of a deburring device usable in a gear-cutting machine.

The example of a suitable deburring cutterhead 40 can be inferred from granted European patent EP1598137 B1. A corresponding deburring cutterhead 40 is shown in FIG. 8. Details which were not described here can be inferred from cited patent EP1598137 B1.

An embodiment of a deburring cutterhead 40, as shown in FIG. 8, has a modular structure. A cylindrical main holder 51 is used, which has n (e.g., with n=1, 2, 3, 4, 5, 6) rectangular recesses in the lower region, the size of which is designed for the cross section of the bar 62 of the bar cutters 61. A ring 52 can be pushed onto the lower region of the main holder 51, as can be seen in FIG. 8. The ring 52 can have recesses which extend partially around the bar cutter 61. A clamping cover 53 can be provided, which covers the lower region of the deburring cutterhead 40, as shown in FIG. 8.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A method comprising:
    deburring in a continuous method a bevel gear defining a bevel gear heel, a bevel gear toe, at least one tooth and at least one tooth gap defining at least one tooth edge, by using a deburring tool including at least one cutting edge, the deburring step comprising:
        rotationally driving the deburring tool around a deburring spindle axis,
        rotationally driving the bevel gear around a workpiece spindle axis in a coupled manner with said rotationally driving the deburring tool using an inverse coupling transmission ratio,
        executing a relative flight movement of the at least one cutting edge relative to the bevel gear, wherein the relative flight movement is defined by a hypocycloid, and
        removing at least one burr located at or near one or more of the bevel gear heel or the bevel gear toe from at least one of the at least one tooth edge by cuttingly contacting the at least one cutting edge with the at least one of the at least one tooth edge.

2. A method according to claim 1, wherein the at least one tooth includes a tooth base and a tooth head, and the executing step includes executing the relative flight movement of the at least one cutting edge in the at least one tooth gap from at or near the tooth base and in a direction towards the tooth head.

3. A method according to claim 1, wherein the inverse coupling transmission ratio is defined by a hypocycloid coupling.

4. A method according to claim 1, wherein the deburring tool defines a number of threads and the at least one tooth defines a number of teeth, and the inverse coupling transmission ratio is defined by the number of teeth and the number of threads.

5. A method according to claim 2, including performing the cuttingly contacting step by said step of executing the relative flight movement of the at least one cutting edge in the at least one tooth gap, and thereby removing the at least one burr from the at least one of the at least one tooth edge.

6. A method according to claim 5, including executing the relative flight movement of the at least one cutting edge so that the at least one of at the at least one tooth edge and the at least one cutting edge move away relative to each other after the cuttingly contacting step.

7. A method according to claim 1, further including using the inverse coupling transmission ratio during the deburring step to automatically reduce a chamfer that results at or near the at least one of the at least one tooth edge when the deburring tool starts to lag.

8. A method according to claim 2, wherein the inverse coupling transmission ratio is defined by a hypocycloid coupling.

9. A method according to claim 2, wherein the deburring tool defines a number of threads and the at least one tooth defines a number of teeth, and the inverse coupling transmission ratio is defined by the number of teeth and the number of threads.

10. A method according to claim 2, further including using the inverse coupling transmission ratio during the deburring step to automatically reduce a chamfer that results at or near the at least one of the at least one tooth edge when the deburring tool starts to lag.

11. A method according to claim 3, wherein the deburring tool defines a number of threads and the at least one tooth defines a number of teeth, and the inverse coupling transmission ratio is defined by the number of teeth and the number of threads.

12. A method according to claim 3, further including using the inverse coupling transmission ratio during the deburring step to automatically reduce a chamfer that results at or near the at least one of the at least one tooth edge when the deburring tool starts to lag.

13. A method according to claim 4, further including using the inverse coupling transmission ratio during the deburring step to automatically reduce a chamfer that results at or near the at least one of the at least one tooth edge when the deburring tool starts to lag.

14. A CNC gear-cutting machine comprising:
  a workpiece spindle configured to mount and rotationally drive a workpiece,
  at least six axes, and
  a software module,
  wherein the CNC gear-cutting machine is configured to execute the following steps:
    deburring in a continuous method a bevel gear defining a bevel gear heel, a bevel gear toe, at least one tooth and at least one tooth gap defining at least one tooth edge, by using a deburring tool including at least one cutting edge, the deburring step comprising:
      rotationally driving the deburring tool around a deburring spindle axis,
      rotationally driving the bevel gear around a workpiece spindle axis in a coupled manner with said rotationally driving the deburring tool using an inverse coupling transmission ratio,
      executing a relative flight movement of the at least one cutting edge relative to the bevel gear, wherein the relative flight movement is defined by a hypocycloid, and
      removing at least one burr located at or near one or more of the bevel gear heel and the bevel gear toe from at least one of the at least one tooth edge by cuttingly contacting the at least one cutting edge with the at least one of the at least one tooth edge.

15. A CNC gear-cutting machine according to claim 14, wherein the software module is configured to predefine an inverse coupling transmission ratio defining the hypocycloid relative flight movement.

* * * * *